(12) United States Patent
Huang

(10) Patent No.: US 11,781,693 B2
(45) Date of Patent: Oct. 10, 2023

(54) PIPE FITTINGS WITH FILTER

(71) Applicant: YUAN MEI CORP., Changhua Hsien (TW)

(72) Inventor: Wei-Kai Huang, Changhua Hsien (TW)

(73) Assignee: YUAN MEI CORP., Changhua Hsien (TW)

( * ) Notice: Subject to any disclaimer, the term of this patent is extended or adjusted under 35 U.S.C. 154(b) by 376 days.

(21) Appl. No.: 17/018,839

(22) Filed: Sep. 11, 2020

(65) Prior Publication Data

US 2022/0082194 A1   Mar. 17, 2022

(51) Int. Cl.
*F16L 37/252*   (2006.01)
*B01D 35/34*   (2006.01)
*B01D 35/04*   (2006.01)

(52) U.S. Cl.
CPC ............ *F16L 37/252* (2013.01); *B01D 35/04* (2013.01); *B01D 35/34* (2013.01); *B01D 2201/0415* (2013.01)

(58) Field of Classification Search
CPC ............ B01D 35/04; B01D 2201/0415; B01D 35/34; F16L 37/252; F16L 37/256; F16L 37/47
See application file for complete search history.

(56) References Cited

U.S. PATENT DOCUMENTS

| | | | |
|---|---|---|---|
| 4,722,794 A * | 2/1988 | Duncan | B01D 35/04 137/550 |
| 5,045,192 A * | 9/1991 | Terhune | B01D 29/15 210/DIG. 17 |
| 5,361,801 A * | 11/1994 | Kerpan | B01D 35/04 210/449 |
| 5,567,310 A * | 10/1996 | Nakashima | B01D 29/01 210/357 |
| 2005/0205485 A1* | 9/2005 | Jorgensen | B01D 29/23 210/485 |
| 2005/0205486 A1* | 9/2005 | Melin | B01D 29/23 210/512.1 |

FOREIGN PATENT DOCUMENTS

EP   0207233 A1   1/1987

* cited by examiner

*Primary Examiner* — David Bochna

(74) *Attorney, Agent, or Firm* — Muncy, Geissler, Olds & Lowe, P.C.

(57) ABSTRACT

Pipe fittings with a filter contain a body, a filter valve, and two seal gaskets. The body includes a first connection pipe and a second connection pipe, a receiving orifice, and at least one guide slot. The filter valve includes a driven section and an operation portion. The two seal gaskets are accommodated in the first peripheral groove and the second peripheral groove respectively. The driven section has a first peripheral groove, a second peripheral groove, and a filtration orifice defined between the first peripheral groove and the second peripheral groove and communicating with the driven section, and at least one fixing bolt mounted between the operation portion and the first peripheral groove and extending outward from the driven section. The at least one fixing bolt slides into the at least one guide slot respectively so that the filter valve is accommodated in the receiving orifice.

11 Claims, 8 Drawing Sheets

PIPE FITTINGS WITH FILTER

BACKGROUND

Technical Field

The present disclosure relates to pipe fittings with a filter.

Related Art

Conventional pipe fittings are applied to filter fluid between at least one connection pipe so as to avoid a block of impurities of the fluid in an inlet of a washing machine, an outlet of a faucet, and a drawing end of a pump by ways of a filter.

The pipe fittings contain two water connectors, one of which is accommodated in a holding disc configured to flow the fluid, wherein the holding disc has a semispherical filter, and the two water connectors are mounted by screwing at least one nut with threads of the two water connectors, wherein two seal gaskets are fixed on two screwing portions of the two water connectors respectively.

However, a size of the filter is limited by the at least one connection pipe, thus reducing filtration efficiency.

Furthermore, the filter is removed after unscrewing the at least one nut by using a wrench.

Patent application publication EP 0207233 A1 discloses a stop valve comprising a rotatable plug member that has three basic modes. Two of them are the standard modes of a valve, namely a first mode in which a fluid can pass the valve and a second mode in which the through-flow is blocked. A further mode allows for the filter arranged on the plug and filtering the fluid in the first mode to be cleaned by removing particulate matter deposited on the filter surface. The plug is attached on the valve's housing by means of a resilient member extending from the plug along the plug's axis of rotation and being provided with a bulb portion. The resilient member is inserted into an end wall opening, thereby preventing the plug from being easily detached from the housing of the valve. Furthermore, an indexing tab extends axially from the end face of the plug and into an arcuate slot formed in the inner surface of the housing so that the rotation of the plug is limited by the length of said arcuate slot.

SUMMARY

A primary aspect of the present invention is to provide pipe fittings with a filter which filters fluid flowing between the first connection pipe and the second connection pipe.

Secondary aspect of the present invention is to provide pipe fittings with a filter which removes the filter easily.

Further aspect of the present invention is to provide pipe fittings with a filter which contains the filter of large size.

Another aspect of the present invention is to provide pipe fittings with a filter which replaces the filter easily.

Other objects and features will be in part apparent and in part pointed out hereinafter.

To obtain above-mentioned aspects, pipe fittings with a filter provided by the present invention contains: a body, a filter valve, and two seal gaskets.

The body includes a first connection pipe and a second connection pipe which are connected on two ends of the body respectively, a receiving orifice defined between and communicating with the first connection pipe and the second connection pipe, and at least one guide slot formed on the receiving orifice. The receiving orifice is cylindrical and has at least one opening defined on one of two ends of the receiving orifice.

The filter valve includes a driven section and an operation portion arranged on an end of the driven section.

The two seal gaskets are accommodated in a first peripheral groove and a second peripheral groove respectively.

The driven section has the first peripheral groove, the second peripheral groove which are defined on two sides of the driven section respectively, and a filtration orifice defined between the first peripheral groove and the second peripheral groove and communicating with the driven section, and at least one fixing bolt mounted between the operation portion and the first peripheral groove and extending outward from the driven section. The at least one fixing bolt slides into the at least one guide slot respectively so that the filter valve is accommodated in the receiving orifice. The at least one guide slot is open and is formed on the at least one opening of the receiving orifice.

Preferably, the filter is accommodated in the filtration orifice of the driven section, such that fluid flows between the first connection pipe and the second connection pipe and is filtered by the filter.

Preferably, the receiving orifice has two guide slots formed on two sides of the at least one opening of the receiving orifice, and the two guide slots correspond to two fixing bolts individually.

Preferably, the at least one guide slot accommodates at least one positioning projection adjacent to at least one bottom of the at least one guide slot respectively so as to stop a removal of the at least one fixing bolt.

Preferably, the filter is removably accommodated in the filtration orifice.

Preferably, the filtration orifice has at least one support rib configured to support the filter.

Preferably, the filtration orifice has multiple horizontal support ribs and multiple vertical support ribs perpendicular to the multiple horizontal support ribs.

Preferably, the receiving orifice has a recess defined on at least one opening of one of two ends of the receiving orifice adjacent to the second connection pipe.

Preferably, the filter is one-piece formed in the filtration orifice.

Preferably, a diameter of the driven section is more than that of a connection portion between the first connection pipe and the second connection pipe.

Preferably, a contour of the at least one fixing bolt (26) is shaped as droplet.

BRIEF DESCRIPTION OF THE DRAWINGS

Corresponding reference characters indicate corresponding parts throughout the drawings.

DETAILED DESCRIPTION

Figure 1:
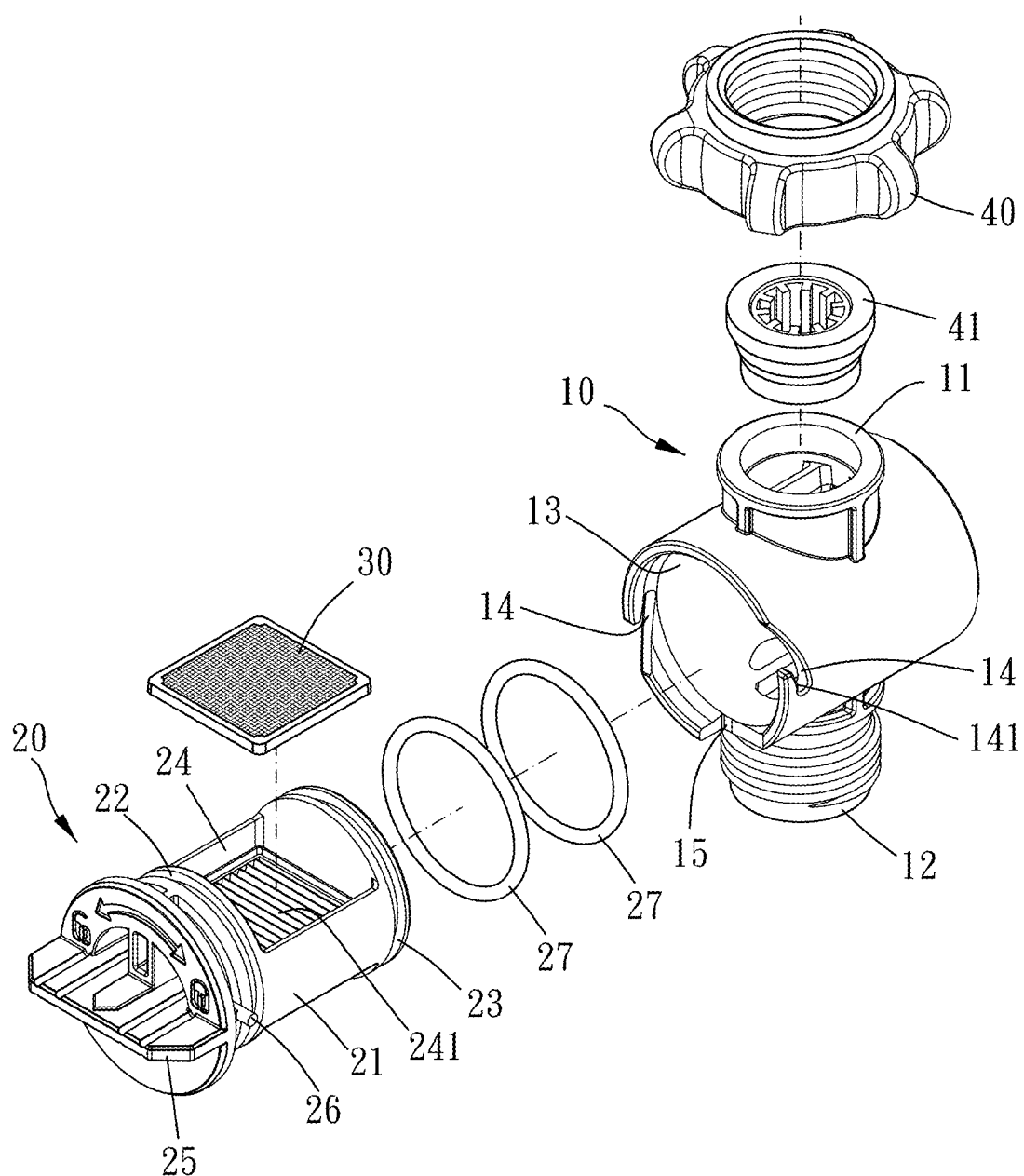
FIG. 1 is a perspective view showing the exploded components of pipe fittings with a filter according to a first embodiment of the present invention.

With reference to FIG. 1, pipe fittings with a filter according to a first embodiment of the present invention at least comprises: a body 10, a filter valve 20, two seal gaskets 27, and the filter 30.

The body 10 includes a first connection pipe 11 and a second connection pipe 12 which are connected on two ends of the body 10 respectively, a receiving orifice 13 defined between and communicating with the first connection pipe 11 and the second connection pipe 12, and at least one guide slot 14 formed on the receiving orifice 13.

Figure 2:
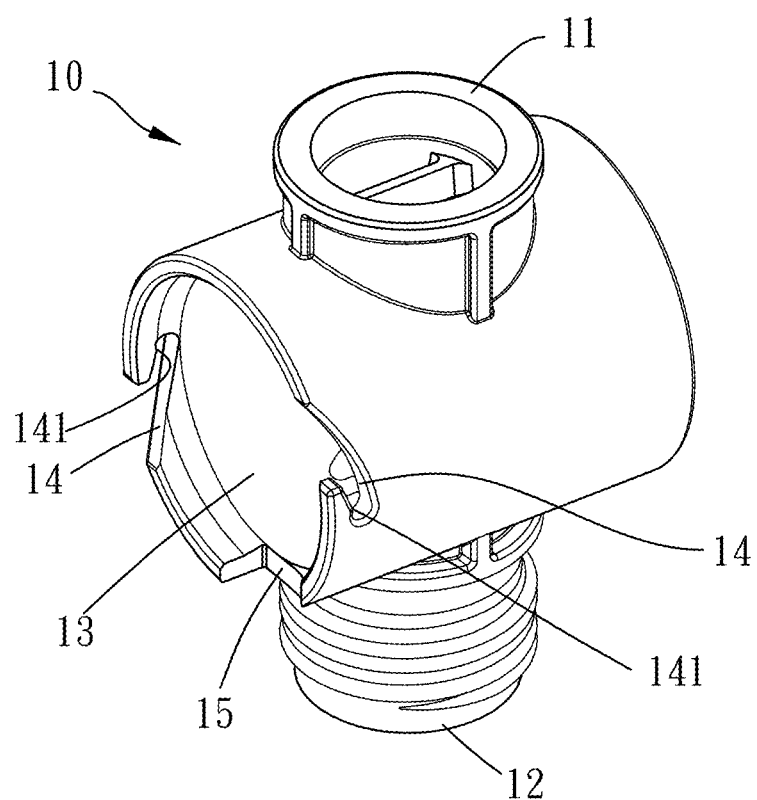
FIG. 2 is a perspective view showing the assembly of a part of the fittings with the filter according to the first embodiment of the present invention.

Referring to FIG. 2, the first connection pipe 11 and the second connection pipe 12 are in communication with each other in the body 10 and are connected with other pipes respectively. For example, the first connection pipe 11 is hollow and is connected with a water connector 40 having a screw nut, and the water connector 40 is connected with a first flow pipe having a threaded section, wherein the water connector 40 has a leak-proof rubber 41 accommodated therein. The second connection pipe 12 has outer threads formed on an outer wall thereof so as to screw with a screw nut of a second flow pipe.

The receiving orifice 13 is perpendicular to the first connection pipe 11 and the second connection pipe 12, and the first connection pipe 11, the second connection pipe 12 and the receiving orifice 13 are injection molded or are machined by ways of a mold. The receiving orifice 13 is cylindrical and has at least one opening defined on one of two ends of the receiving orifice 13, and the receiving orifice 13 has the at least one guide slot 14 formed on the at least one opening of the one end of the receiving orifice 13.

In this embodiment, the receiving orifice 13 has two guide slots 14 formed on the at least one opening of the one end of the receiving orifice 13 proximate to the first connection pipe 11, and the receiving orifice 13 has a recess 15 defined the at least one opening of the one end of the receiving orifice 13 adjacent to the second connection pipe 12.

Figure 3:
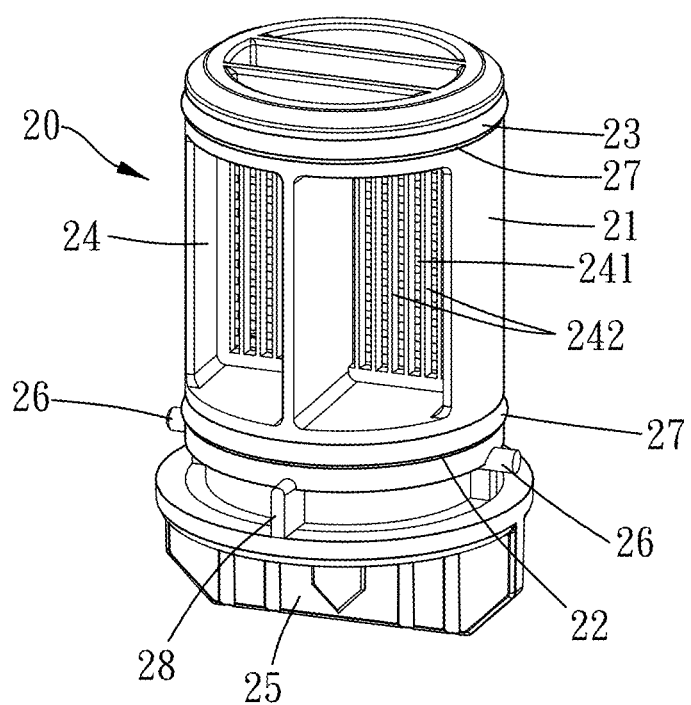
FIG. 3 is another perspective view showing the assembly of a part of the fittings with the filter according to the first embodiment of the present invention.

As shown in FIG. 3, the filter valve 20 includes a driven section 21 and an operation portion 25 arranged on an end of the driven section 21, wherein the operation portion 25 is any one of a lever, a rotary button, and a spherical knob so as to be manually operated by a user, such that the driven section 21 is driven by the operation portion 25 to be pushed into or to be pulled out of the receiving orifice.

A diameter of the driven section 21 is more than that of a connection portion between the first connection pipe 11 and the second connection pipe 12, such that the filter 30 is accommodated in the driven section 21 so as to enhance filtration efficiency.

The driven section 21 has a first peripheral groove 22, a second peripheral groove 23 which are defined on two sides of the driven section 21 respectively, and a filtration orifice 24 defined between the first peripheral groove 22 and the second peripheral groove 23 and communicating with the driven section 21, wherein the filtration orifice is square or is in other shapes.

At least one fixing bolt 26 is mounted between the operation portion 25 and the first peripheral groove 22 and extends outward from the driven section 21, the at least one guide slot 14 is open, and the at least one guide slot 14 is tilted or is arcuate. In this embodiment, the at least one guide slot 14 is open and is arcuate. The operation portion 25 is operated manually to drive the at least one fixing bolt 26 to slide into a distal end of the at least one guide slot 14 so that the filter valve 20 is fixed in the receiving orifice 13. In this embodiment, the driven section 21 has two bolts 26 corresponding to the two guide slots 14 respectively, and the driven section 21 has a protrusion 28 formed between the two bolts 26 and corresponding to the recess 15.

In this embodiment, the driven section 21 is cylindrical. In another embodiment, the driven section 21 is conical so as to match with the receiving orifice 13 which is conical, and the driven section 21 is moved in receiving orifice 13 matingly.

The two seal gaskets 27 are accommodated in the first peripheral groove 22. and the second peripheral groove 23 respectively, and the filter 30 is removably accommodated in the filtration orifice 24 of the driven section 21, such that fluid flows between the first connection pipe 11 and the second connection pipe 12 and is filtered by the filter 30, and the filter 30 is removed easily by ways of the operation portion 25.

Preferably, the receiving orifice 13 has a guide slot 14 formed on the at least one opening of the one end of the receiving orifice 13 proximate to the first connection pipe 11, and the driven section 21 has a bolt 26 corresponding to the guide slot 14 so as to avoid a removal of the driven section 21 from the receiving orifice 13.

Figure 4:
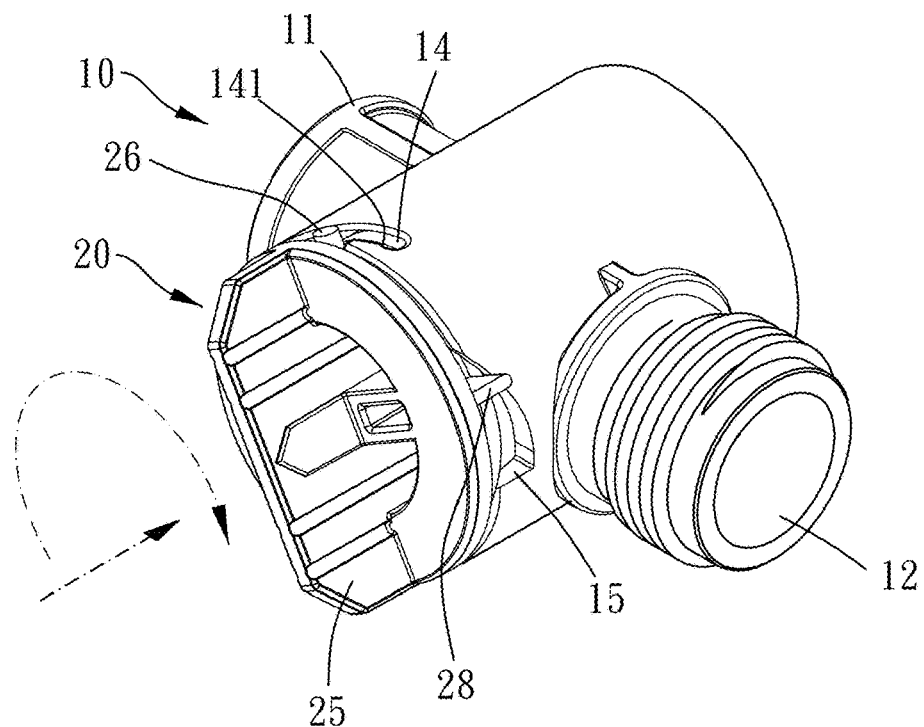
FIG. 4 is a perspective view showing the operation of a part of the fittings with the filter according to the first embodiment of the present invention.

As illustrated in FIG. 2-4, the driven section 21 is inserted into the receiving orifice 13 of the body 10, the at least one fixing bolt 26 is aligned with the at least one guide slot 14, and the operation portion 25 is manually rotated so that the at least one fixing bolt 26 is guided by the at least one guide slot 14 to let the driven section 21 move into and accommodate in the receiving orifice 13.

The at least one guide slot 14 accommodates at least one positioning projection 141 adjacent to at least one bottom of the at least one guide slot 14 respectively so as to stop a removal of the at least one fixing bolt 26.

Figure 5:
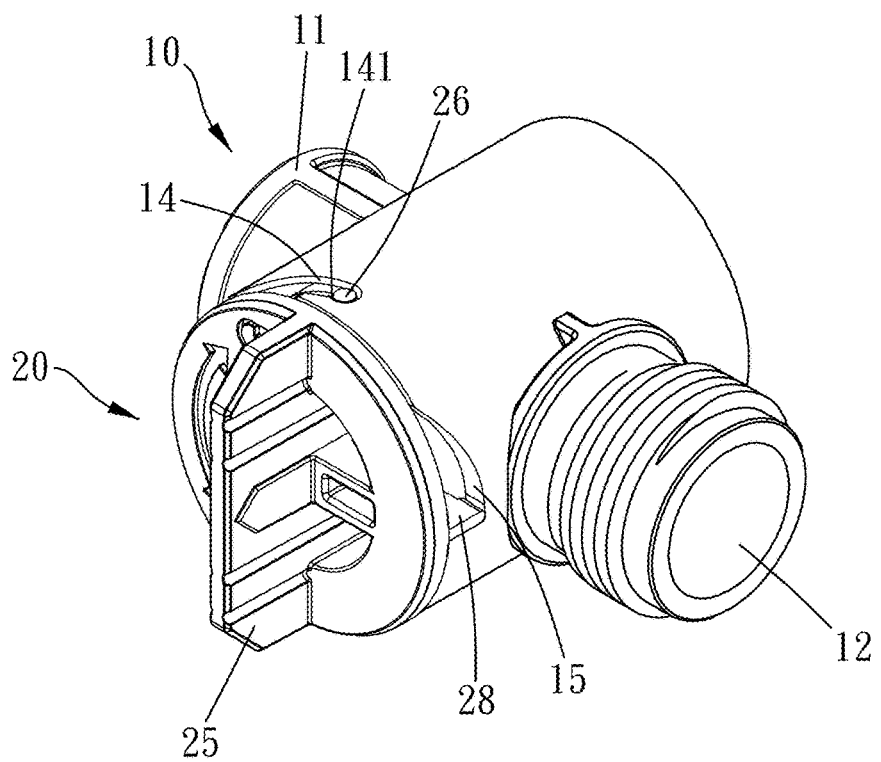
FIG. 5 is also another perspective view showing the assembly of a part of the fittings with the filter according to the first embodiment of the present invention.
Figure 6:
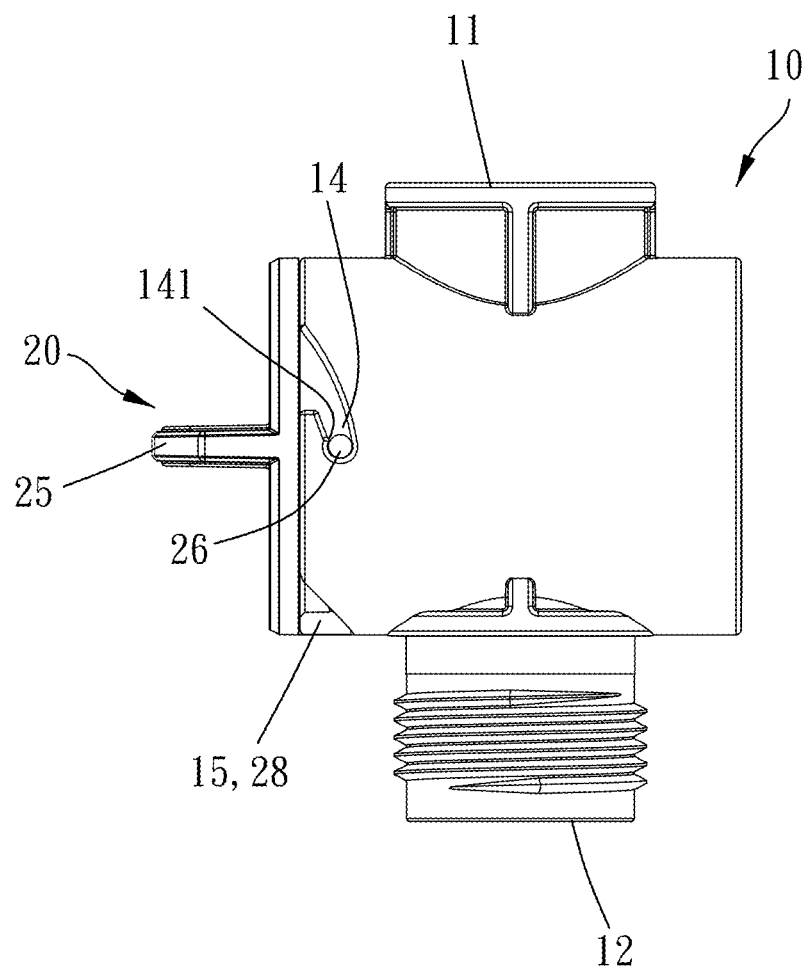
FIG. 6 is a side plan view showing the assembly of a part of the fittings with the filter according to the first embodiment of the present invention.
Figure 7:
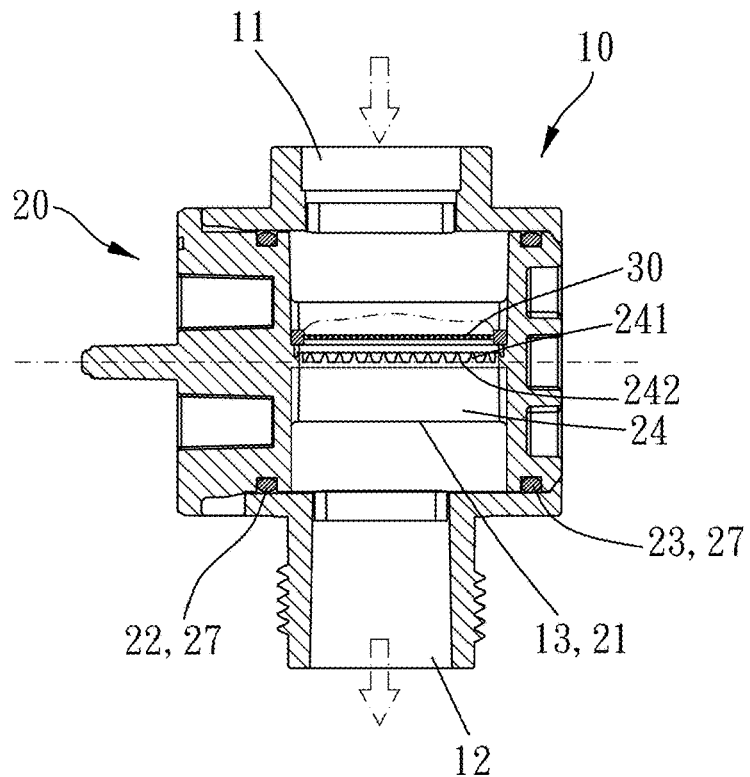
FIG. 7 is a cross sectional view showing the operation of a part of the fittings with the filter according to the first embodiment of the present invention.

With reference to FIGS. 5-7, when the at least one fixing bolt 26 is guided by the at least one guide slot 14 to slide toward the at least one bottom of the at least one guide slot 14 respectively so as to be stopped by the at least one positioning projection 141, the driven section 21 is moved into the receiving orifice 13 completely.

When the fluid (i.e., water or air) flows into the second connection pipe 12 from the first connection pipe 12 via the filter 30, impurities in the fluid are stopped by the filter 30 and the fluid is stopped by the two seal gaskets 27 so as to avoid a leakage of the fluid between the driven section 21 and the receiving orifice 13.

The filter 30 is accommodated and is adhered in the filtration orifice 24 of the driven section 21 by using adhesive or high frequency equipment.

The filter 30 is removably accommodated in the filtration orifice 24 so as to be replaced. Preferably, the filtration orifice 24 has at least one support rib configured to support the filter 30, thus fixing the filter 30 in the filtration orifice 24 securely.

Referring to FIGS. 1, 3, and 7, the filtration orifice 24 has multiple horizontal support ribs 241 and multiple vertical support ribs 242 perpendicular to the multiple horizontal support ribs 241, wherein multiple slits are defined among the multiple horizontal support ribs 241 and the multiple vertical support ribs 242 individually so that the fluid flows through the multiple slits, and the filter 30 is removably accommodated in the filtration orifice 24.

The receiving orifice 13 has the recess 15, and the driven section 21 has the protrusion 28 extending outward from the driven section 21 and located between the operation portion 25 and the first peripheral groove 22 so that the protrusion 28 corresponds to and engages with the recess 15, thus fixing the filter 30 in the receiving orifice 13 in a correct direction.

Figure 8:
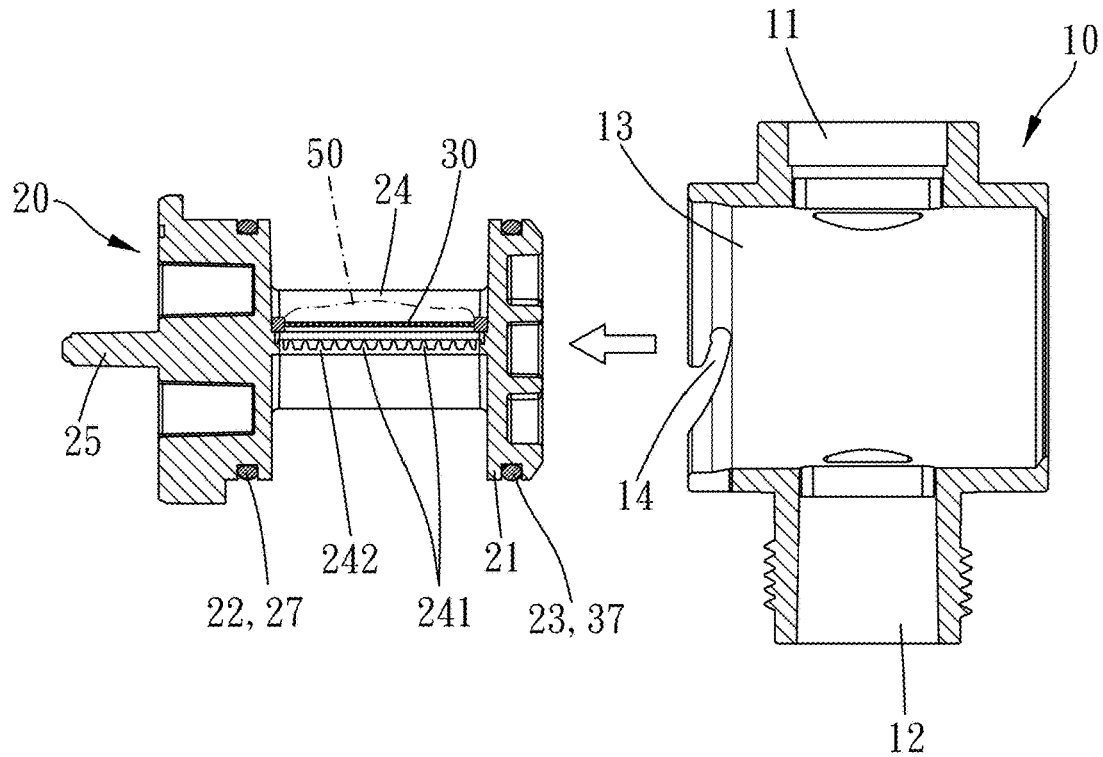
FIG. 8 is another cross-sectional view showing the operation of a part of the fittings with the filter according to the first embodiment of the present invention.

As shown in FIG. 8, the operation portion 25 is rotated so that the at least one fixing bolt 26 moves across the at least one positioning projection 141 and slides out of the at least one guide slot 14, the driven section 21 is removed from the receiving orifice 13, and the filter 30 is detachable so as to eliminate the impurities 50 from the filter 30. Thereafter, the filter 30 is fixed in the receiving orifice 13 by rotating the operation portion 25 after being cleaned.

Figure 9:
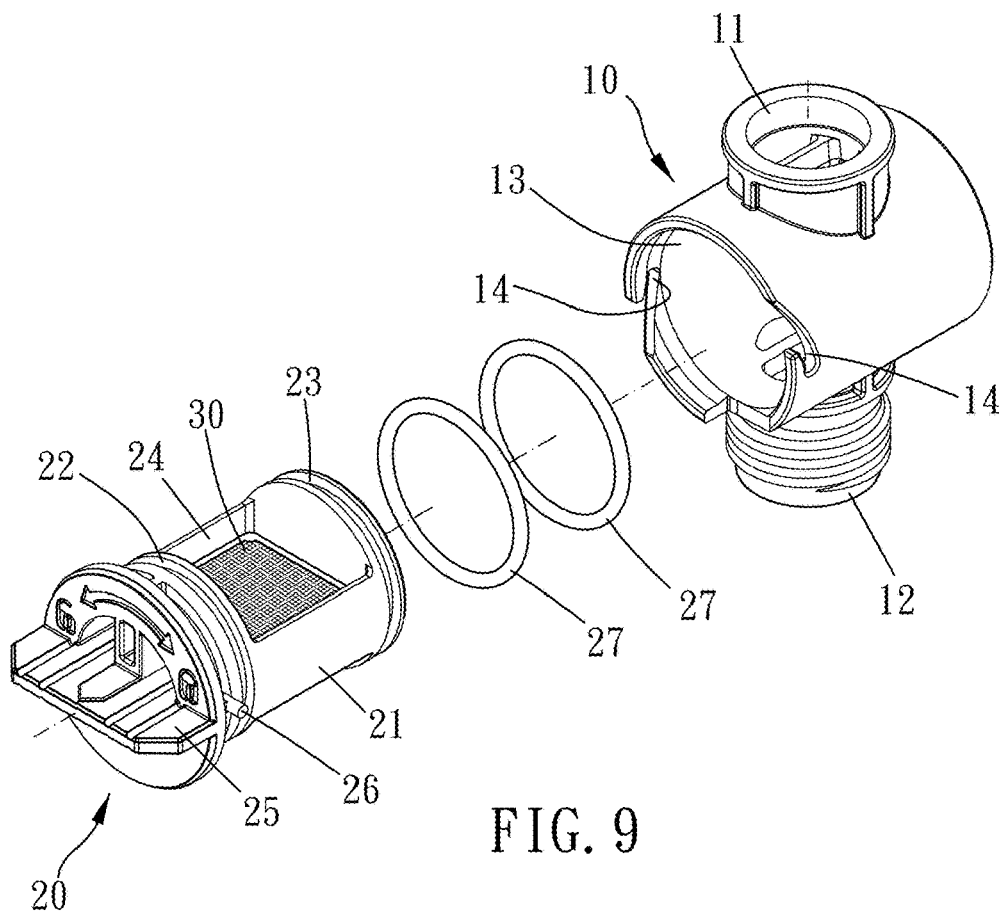
FIG. 9 is a perspective view showing the exploded components of pipe fittings with a filter according to a second embodiment of the present invention.
Figure 10:
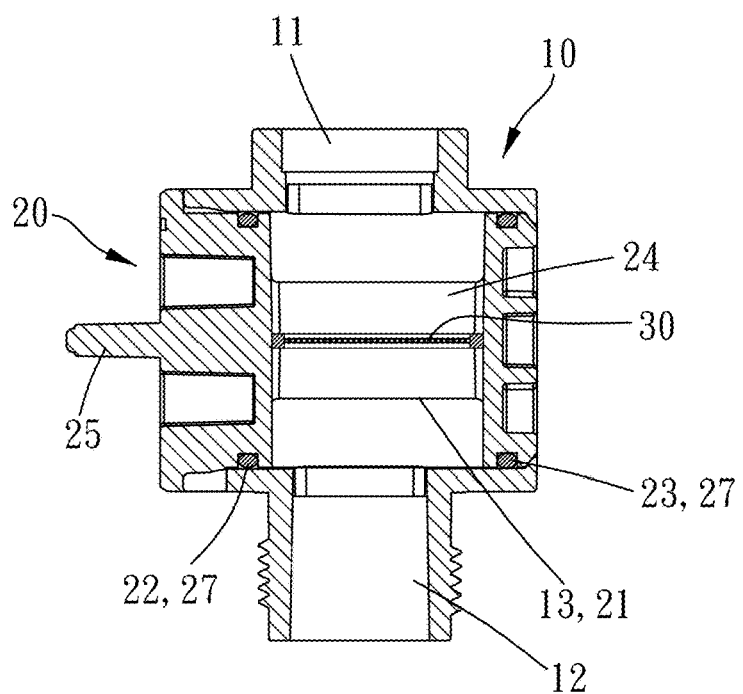
FIG. 10 is a cross sectional view showing the assembly of the pipe fittings with the filter according to the second embodiment of the present invention.

As illustrated in FIGS. 9 and 10, in a second embodiment, the filter 30 is one-piece formed in the filtration orifice 24. For example, the filter 30 is injection molded from plastic material with the filtration orifice 24 so as to eliminate the protrusion 28 and the recess 15, thus reducing fabrication cost.

In this embodiment, the at least one positioning projection 141 is adjacent to at least one bottom of the at least one guide slot 14 to form a mounted slot for accommodating and stopping a removal of the at least one fixing bolt 26, a portion of a contour of the at least one fixing bolt 26 contact with a contour of the mounted slot, and the other portion of the contour of the at least one fixing bolt 26 is protruded from the mounted slot. An opening of the mounted slot is formed between the at least one positioning projection (141) and the guide surface (142), a contour of the mounted slot is an arc shape when viewed in cross-section, and a size of the at least one fixing bolt 26 inside the mounted slot is larger than the opening the mounted slot when viewed in cross-section.

The contour of the at least one fixing bolt 26 contacted with the contour of the mounted slot is shaped as arc when viewed in cross-section, in this situation, whole contour of the at least one fixing bolt 26 is a circle shape when viewed in cross-section.

Figure 11:
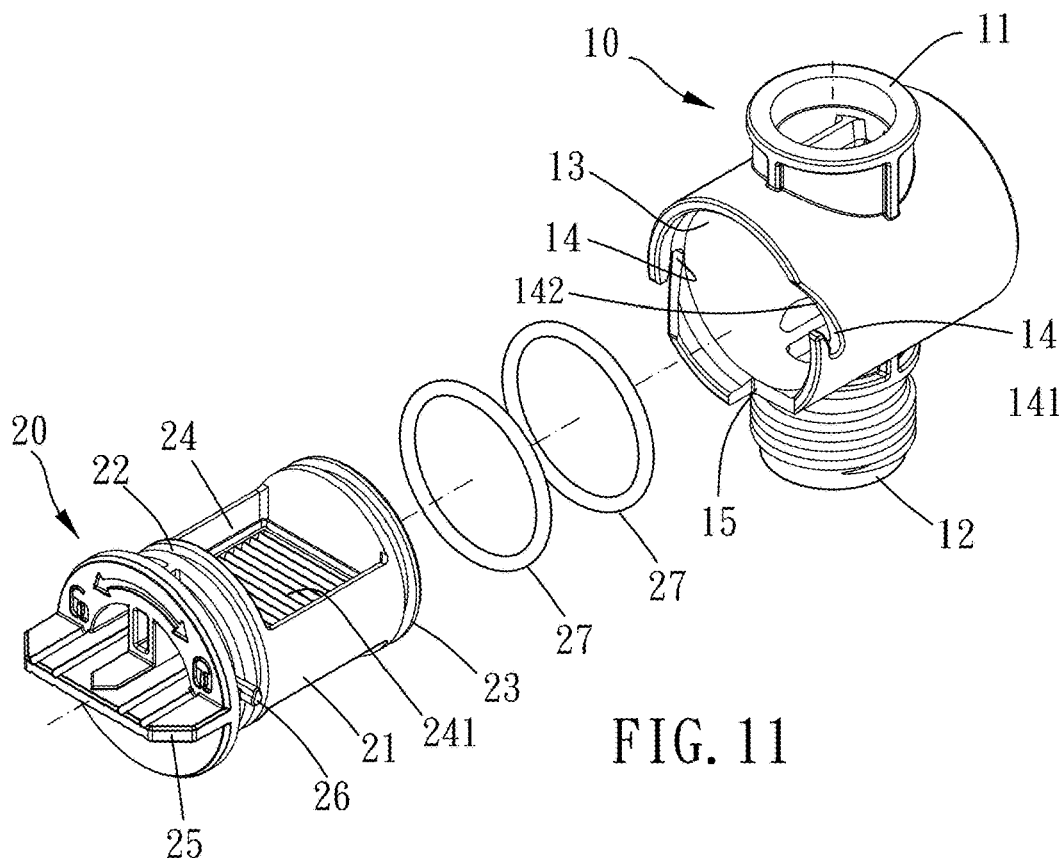
FIG. 11 is a perspective view showing the exploded components of parts of pipe fittings with a filter according to a third embodiment of the present invention.
Figure 12:
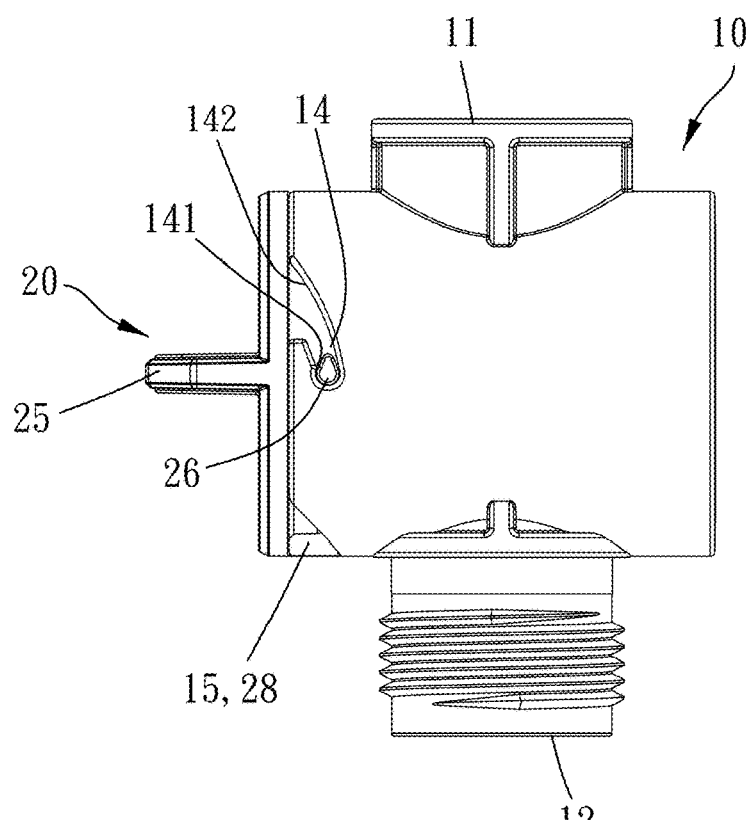
FIG. 12 is a side plan view showing the assembly of a part of the fittings with the filter according to the third embodiment of the present invention.

As illustrated in FIGS. 11 and 12, in a third embodiment, the receiving orifice 13 has the at least one guide slot 14 with a guide surface 142 formed on the at least one opening of the one end of the receiving orifice 13, and at least one fixing bolt 26 is mounted between the operation portion 25 and the first peripheral groove 22 and extends outwardly from the driven section 21.

The operation portion 25 is manually rotated so that the at least one fixing bolt 26 is guided by the guide surface 142 of at least one guide slot 14 to let the driven section 21 move into and accommodate in the receiving orifice 13. When the operation portion 25 is manually rotated to remove the support the filter 20, the guide surface 142 of the at least one guide slot 14 may transmit a rotational force received by the operation portion 25 into a lateral force to press against the at least one fixing bolt 26 outwardly, as a result, the at least one fixing bolt 26 may easily remove form the least one guide slot 14. Besides, a contour of the at least one fixing bolt 26 may be a tear drop shape when viewed in cross-section to corresponds with the structure of the guide surface 142 on the at least one guide slot 14. The tear drop shape of the at least one fixing bolt 26 has a portion of the contour shaped as arc, when viewed in cross-section, to contact with the mounted slot; and the other portion of the contour shaped as peak, when viewed in cross-section, outwardly protruded from the opening mounted slot.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

Having described the invention in detail, it will be apparent that modifications and variations are possible without departing from the scope of the invention defined in the appended claims.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved, and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. Pipe fittings with a filter (30) comprising:
    a body (10) including a first connection pipe (11) and a second connection pipe (12) which are connected on two ends of the body (10) respectively, a receiving orifice (13) defined between and communicating with the first connection pipe (11) and the second connection pipe (12), and at least one guide slot (14) formed on the receiving orifice (13), wherein the receiving orifice (13) is cylindrical and has at least one opening defined on one of two ends of the receiving orifice (13);
    a filter valve (20) including a driven section (21) and an operation portion (25) arranged on an end of the driven section (21); and
    two seal gaskets (27) accommodated in a first peripheral groove (22) and a second peripheral groove (23) respectively;
    wherein the driven section (21) has the first peripheral groove (22), the second peripheral groove (23) which are defined on two sides of the driven section (21) respectively, and a filtration orifice (24) defined between the first peripheral groove (22) and the second peripheral groove (23) and communicating with the driven section (21), wherein:

at least one fixing bolt (26) mounted between the operation portion (25) and the first peripheral groove (22) and extending outward from the driven section (21), wherein the at least one fixing bolt (26) slides into the at least one guide slot (14) respectively so that the filter valve (20) is accommodated in the receiving orifice (13), wherein the at least one guide slot (14) is open and is formed on the at least one opening of the receiving orifice (13);

wherein the at least one guide slot (14) have a guide surface (142) and at least one positioning projection (141), the at least one positioning projection (141) is adjacent to at least one bottom of the at least one guide slot (14) to form a mounted slot for fixing and stopping a removal of the at least one fixing bolt (26), an opening of the mounted slot is formed between the at least one positioning projection (141) and the guide surface (142), a contour of the mounted slot is an arc shape when viewed in cross-section;

wherein, when the at least one fixing bolt (26) is fixed into the mounted slot, the contour of the mounted slot and a portion of a contour of the at least one fixing bolt (26) are completely in contact with each other, a portion of the at least one fixing bolt (26) is outwardly protruded from the opening of the mounted slot, a portion of the at least one fixing bolt (26) inside the mounted slot is larger than the opening of the mounted slot when viewed in cross-section;

wherein, the guide surface (142) of the at least one guide slot (14) is used to press against the at least one fixing bolt (26) and guide the fixing bolt outwardly when the filter valve (20) is removed from the receiving orifice (13) and enables the at least one fixing bolt (26) to be removed from the mounted slot.

2. The pipe fittings as claimed in claim 1, wherein the filter (30) is accommodated in the filtration orifice (24) of the driven section (21), such that fluid flows between the first connection pipe (11) and the second connection pipe (12) and is filtered by the filter (30).

3. The pipe fittings as claimed in claim 2, wherein the filter (30) is removably accommodated in the filtration orifice (24).

4. The pipe fittings as claimed in claim 3, wherein the filtration orifice (24) has at least one support rib configured to support the filter (20).

5. The pipe fittings as claimed in claim 4, wherein the filtration orifice (24) has multiple horizontal support ribs (241) and multiple vertical support ribs (242) perpendicular to the multiple horizontal support ribs (241).

6. The pipe fittings as claimed in claim 4, wherein the receiving orifice (13) has a recess (15) defined on at least one opening of one of two ends of the receiving orifice (13) adjacent to the second connection pipe (12).

7. The pipe fittings as claimed in claim 2, wherein the filter (30) is one-piece formed in the filtration orifice (24).

8. The pipe fittings as claimed in claim 1, wherein the receiving orifice (13) has two guide slots (14) formed on two sides of the at least one opening of the receiving orifice (13), and the two guide slots (14) correspond to two fixing bolts (26) individually.

9. The pipe fittings as claimed in claim 1, wherein a diameter of the driven section (21) is more than that of a connection portion between the first connection pipe (11) and the second connection pipe (12).

10. The pipe fittings as claimed in claim 1, wherein the contour of the at least one fixing bolt (26) is a circle shape when viewed in cross-section.

11. The pipe fittings as claimed in claim 10, wherein the contour of the at least one fixing bolt (26) is a tear drop shape when viewed in cross-section.

\* \* \* \* \*